Patented Sept. 9, 1952

2,610,191

UNITED STATES PATENT OFFICE 2,610,191

TETRA (CARBOXY PHENYL) THIOPHENE AND METHOD OF MAKING SAME

William G. Toland, Jr., Richmond, Calif., assignor to California Research Corporation, San Francisco, Calif., a corporation of Delaware No Drawing. Application September 26, 1949, Serial No. 117,943

14 Claims. (Cl. 260—329)

This invention relates to a new and improved polymerization process and novel compounds produced thereby. More particularly the invention relates to a new and improved process of preparing stilbene dicarboxylic acids and novel tetra (carboxy phenyl) thiophenes.

Stilbene dicarboxylic acids have been previously prepared by various methods known to the art. However, the prior processes involve a multiplicity of complicated or expensive steps and, where the yields of the preparation were disclosed, they proved to be poor. By-products formed during these previous preparations of stilbene dicarboxylic acids were numerous, and complicated purification or rendered the product difficulty separable.

One of the processes proposed for previous preparations of stilbene dicarboxylic acid that may be considered illustrative of the prior state of the art is that disclosed in an article by Hager, Van Arendonk, and Shonle, appearing in the Journal of the American Chemical Society, volume 66, page 1982, in 1944. In this article the authors disclosed a process wherein dibenzyl was brominated in the 4,4′ and αα′ positions to produce 4,4′,αα′ tetrabromodiphenyl ethane and then converted to 4,4′ dicyano stilbene by treatment with cuprous cyanide. Alcoholysis of the nitrile radicals was used to produce the diethyl ester, which was then saponified to produce p,p′ stilbene dicarboxylic acid. The stilbene dicarboxylic acid product was obtained only in very low yields and no constants were given other than its neutral equivalent of 131, which was comparable to the theoretical neutral equivalent of 134. The carbon-hydrogen analysis was also relied on in identifying the product.

Another and more recent disclosure of a process for preparing stilbene dicarboxylic acids is an article by Bell and Waring which appeared in the Journal of the Chemical Society of July, 1948, on pages 1024–6, inclusive. In this article para-cyanobenzaldehyde and paracyanobenzyl cyanide were heated and treated with piperidine to give alpha 4,4′ tricyano-stilbene which, upon hydrolysis with $H_2SO_4$ and acetic acid, produced alpha-cyano 4,4′ stilbene dicarboxylic acid. The alpha-cyano 4,4′ stilbene dicarboxylic acid was in turn heated with potassium hydroxide to give alpha-4,4′ stilbene tricarboxylic acid, which, on decarboxylation of the ethylene linkage, resulted in 4,4′ stilbene dicarboxylic acid.

In addition to the poor yields and numerous by-products mentioned above as characteristic of previous preparations of stilbene dicarboxylic acids, it may also be noted in both of the above illustrations that several steps involving the formation of intermediate products were utilized. This fact, as well as consumption in the process of relatively expensive chemicals, serves to emphasize the absence of commercial feasibility in the previous processes for preparing stilbene dicarboxylic acids.

The novel and useful tetra (carboxy phenyl) thiophenes have not been prepared by any process prior to the present invention.

I have discovered that stilbene dicarboxylic acids and tetra (carboxy phenyl) thiophenes can be prepared by heating toluic acids to an elevated temperature in the presence of sulfur to dehydrogenate and concurrently polymerize said toluic acids. The following equations are illustrative of the reactions involved in the preparation:

I.
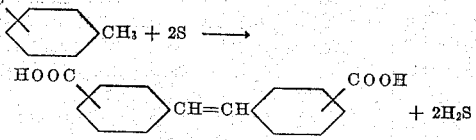

II.
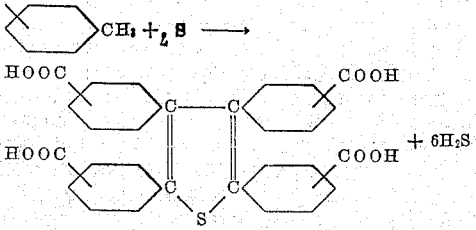

In addition to the reactions illustrated above, the process of dehydrogenating and polymerizing toluic acids can be made to favor the formation of bi-benzyl dicarboxylic acids rather than stilbene dicarboxylic acids and tetra (carboxy phenyl) thiophenes, by increasing the partial pressure of the $H_2S$ on the system. This reaction may be illustrated by the following equation which, however, is not to be implied as setting forth the exact mechanism of the reaction:

III.
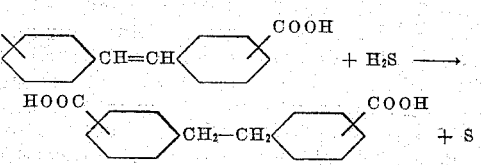

The higher the partial pressure of H₂S on the system, the further the above reaction is driven toward completion favoring bi-benzyl dicarboxylic acid, and, conversely, the lower the partial pressure of H₂S the greater is the proportion of stilbene dicarboxylic acids and the accompanying tetra (carboxy phenyl) thiophenes. For example, when operating at 1 atmosphere or less of H₂S, the formation of the bi-benzyl structure is almost entirely suppressed, while at 50 atmospheres of H₂S the bi-benzyl structure predominates. The overall reaction can then be expressed by the following equation:

IV.

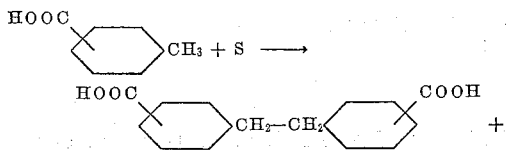

This divisible subject matter relating to the production of bi-benzyl dicarboxylic acids is more fully disclosed and covered in another application, namely, William G. Toland, Jr., U. S. patent application Serial No. 186,927, filed September 26, 1950.

The toluic acids from which stilbene dicarboxylic acids and tetra (carboxy phenyl) thiophenes are prepared according to the present invention may be either the ortho, meta or para isomers of toluic acids or mixtures thereof. The para isomers of toluic acids have been found to lend themselves readily to the process of preparing stilbene dicarboxylic acids and tetra (carboxy phenyl) thiophenes since the relatively high insolubility of the products in the reaction mixture makes them easily separable. Mixtures of meta- and para-toluic acids are also suitable for the purposes of my invention. A mixture of 50% meta-toluic acid and 50% para-toluic acid has been found to be an economical feed for the reaction. Mixed meta-, para-stilbene dicarboxylic acids and tetra (carboxy phenyl) thiophenes have been formed by reacting mixtures of meta- and para-toluic acids with sulfur.

Mixtures of the isomers of toluic acids may be utilized with little or no change in the reaction conditions. The various isomers of toluic acid used in this invention, as well as mixtures thereof, may be obtained from any practical source. One source, for example, that has been found quite suitable for the preparations of the present invention is the production of toluic acid and isomeric mixtures thereof by the partial oxidation of xylenes and their isomeric mixtures.

The sulfur of the reaction may be present in any of its elemental forms. For the purposes of the test whereby the improved process of the invention was derived, it was found that flowers of sulfur were suitable.

Although the reaction will occur over a wide range of temperatures, a particularly suitable range has been found to be from about 415° F. to about 570° F. A still more desirable temperature range would be from about 450° F. to about 550° F., while the one preferred for the present operations is from about 475° F. to about 500° F. Although the reaction will also occur with a wide variety in the proportions of toluic acid and sulfur, as high as 4 mols or more of sulfur to 1 mol of toluic acid, it has been found proportions ranging from about 5 to about 50 mol per cent of sulfur are particularly satisfactory for this process. A preferred range of proportions is from about 10 to about 35 mol per cent of sulfur.

The pressure at which the reaction is carried out may be atmospheric, superatmospheric, or subatmospheric. The superatmospheric pressures may range all the way up to the critical pressure of hydrogen sulfide, which is in the vicinity of about 89 atmospheres, or higher. The subatmospheric pressures may be as low as 20 mm. or lower, depending on what vacuum may be practicably maintained in the equipment utilized for the process.

The reaction is considered complete when H₂S is no longer evolved on continued heating of the reactants. This ordinarily requires a period of from about 30 minutes to 12 hours.

If desired, an inert diluent may be used as a medium for the reaction. Although such diluents tend to greatly facilitate the various steps in the performing of the reaction and overcome any tendency of the toluic acids to sublime, there is an accompanying decrease in the rate of reaction which indicates that the use of diluent ultimately depends upon the particular reaction conditions used in the process of preparing the stilbene dicarboxylic acids and the tetra (carboxy phenyl) thiophenes. In selecting a diluent, its effect upon the solubility of the product of reaction should be considered since a diluent which decreases the solubility of the desired reaction product, that is, the stilbene dicarboxylic acid or the tetra (carboxy phenyl) thiophene, increases the yield by removing the product from further reaction with the sulfur. The inert diluent should also be selected from those possessing high boiling points due to the high temperatures of reaction which are utilized during the preparation. The term "inert diluent" should be understood for the purposes of this invention as including those which are substantially inert toward sulfur, hydrogen sulfide and toluic acid. One diluent that was used and found suitable for the purposes of this invention was diphenyl ether.

Diluents that have the effect of promoting the formation of a desired product, that is, stilbene dicarboxylic acid or tetra (carboxy phenyl) thiophene, may also be used to an advantage in the process of the invention. As an example of diluents of this type, quinoline has been found to favor the formation of tetra (carboxy phenyl) thiophene.

Any suitable method of isolating the stilbene dicarboxylic acids and tetra (carboxy phenyl) thiophenes from the reaction mixture that is known to the art may be utilized. The use of selective solvents may be adapted to the separation stage. Filtration of insoluble product from the reaction mixture may also be resorted to. For practical purposes, the separation of the stilbene dicarboxylic acids may be accomplished by diluting the reaction product with xylene followed by hot filtration. This removes nearly all of the stilbene dicarboxylic acids as an insoluble amorphous powder which may be further purified by additional solvent washing with xylene or acetone or by sublimation. Direct distillation of the unreacted toluic acids from stilbene dicarboxylic acid and tetra (carboxy phenyl) thiophene product using a high boiling oil in the pot to prevent charring of the product is also suitable for the separation step of the process.

For analytical purposes, the stilbene acid has been isolated as a potassium salt which can be readily crystallized from cold water. The tetra (carboxy phenyl) thiophene is then recovered from the filtrate. In this last procedure, the entire reaction mixture was dissolved in about 10% hot KOH solution; on cooling, the insoluble potassium stilbene dicarboxylate crystallized out in white flakes. After the potassium stilbene dicarboxylate was removed, the filtrate containing water soluble salts was acidified, boiled to coagulate and filtered while hot. The precipitate from this filtration was dried and purified by sublimation to remove unreacted toluic acid impurities and yield a residue of tetra (carboxy phenyl) thiophene.

To illustrate in detail the process of this invention and to guide those skilled in the art in the practice thereof, the following example and data obtained thereby are submitted.

EXAMPLE

*Preparation of p,p' stilbene dicarboxylic acid and tetra (p-carboxy phenyl) thiophene*

A four-necked round bottom flask, fitted with a thermometer, a 2 foot air condenser, stirrer, and nitrogen sweep line, was charged with 136.1 g. (1 mol) p-toluic acid and 32.0 g. (1 mol) flowers of sulfur. The pot was electrically heated. Outlet from the air condenser led to a caustic scrubber. Temperature of reactants was increased from 225° C. to 300° C. (436–572° F.) over a 3 hour period, during which a rapid stream of $H_2S$ was evolved and continually flushed from the reactor with nitrogen. Products began solidifying even at 300° C., and had a yellow brown color. The scrubber gained 27.7 g., and analysis showed the presence of 25.2 g. sulfur. The reactor lost 31.6 g. in weight. It was broken open to remove products, which were then ground to a fine powder, weighing 133.7 g.

One hundred grams of product was treated with 50 g. KOH/1 liter of water while hot. A residue of 8 g. black coke with some free sulfur and other yellow colored bodies remained caustic insoluble. The aqueous KOH extract was chilled to room temperature, and the insoluble potassium salt of p,p'-stilbene dicarboxylic acid crystallized out. The filtrate was concentrated and chilled to recover additional quantities of stilbene acid salt. The combined potassium salts were washed and recrystallized twice from hot water. The final crystals appeared as faint lemon yellow plates and needles. All of the filtrates were processed to reclaim either insoluble potassium salt or were added to the dark colored mother liquors containing water soluble salts. All insoluble stilbene acid salts were combined, dissolved in hot water, and the free acid liberated by pouring into hot 5% $H_2SO_4$. This gave a white flocculent precipitate which was boiled to coagulate and was filtered hot, washed with hot water, refiltered, and dried. Weight of p,p'-stilbene dicarboxylic acid obtained was 31.7 g.

Neutral equivalent=135.5 (theoretical=134.1)
Melting point=860° F. (sealed tube)

|  | Found | Theory |
| --- | --- | --- |
| Percent C | 70.94 | 71.6 |
| Percent H | 4.52 | 4.48 |

The dark brown solution of water soluble salts was acidified by pouring into hot 5% $H_2SO_4$, boiling to coagulate, and filtered hot. The precipitate of liberated organic acids, yellow-green to brown in color, was washed with hot water from which 2.5 g. unreacted p-toluic acid was recovered by chilling, filtering, washing, and drying. The colored insoluble acid fraction was then dried and found to weigh 44.0 g. Five grams of this material was heated on a watch glass to sublime out 1.8 g. remaining p-toluic acid.

The non-volatile dark yellow residue proved to be nearly pure tetra (p-carboxy phenyl) thiophene.

Neutral equivalent=141.8 (theoretical=141.1)
Melting point=598–600° F. (charred)

It showed a positive elemental test for sulfur by fusion. Its insolubility in standard solvents and its stability toward fusion and complete combusion made determination of molecular weight, per cent sulfur, carbon, and hydrogen practically unreproducible. Permanganate oxidation yielded terephthalic acid.

Although in the preceding example sulfur was present in the reaction mixture in equimolar proportion, other proportions of sulfur may be utilized. Larger amounts of sulfur may be particularly suitable for reactions wherein the sulfur concentrations are maintained at a fairly low level by slow continuous addition of sulfur during the reaction period. When the sulfur is added in small increments, sufficient time is allowed between additions so that the reaction may be substantially complete before additional sulfur is added. By this method of adding sulfur, the yield of stilbene dicarboxylic acid and tetra (carboxy phenyl) thiophene produced from a given amount of toluic acid is increased.

Since the above example was conducted on such a small scale whereby little loss of toluic by sublimation was encountered, the inert diluent suggested in the forepart of the specification was not utilized. However, it has been found that in preparations involving larger proportions of reactants the use of solvents greatly simplifies the handling of the material. Furthermore, any tendency toward sublimation of the toluic acid is practically eliminated by the use of inert solvents. In addition, by selecting a diluent having a tendency to decrease the solubility of the stilbene dicarboxylic acid product in the reaction medium, higher initial yields are obtained. However, it is not to be assumed that diluents are essential to the reaction, since in some instances they may slow down the reaction so much as to be undesirable.

As may readily be observed from the above example, the preparation of stilbene dicarboxylic acids according to the process of my invention is characterized by a good yield of product. The formation of by-products and the attendant complications in separating the desired stilbene dicarboxylic acid is, by the same reaction, correspondingly low.

On comparison with the previous methods known to the art, the advantages of the process of my invention in preparing stilbene dicarboxylic acids through dehydrogenation and polymerization reactions which occur on heating the toluic acid in the presence of sulfur are readily apparent. For instance, in the preparations of stilbene dicarboxylic acid practiced in the prior art, the yields were consistently poor whenever they were mentioned, and the by-products formed during the reactions were numerous and rendered the product difficultly separable. In the process of my invention, the yield of stilbene dicarboxylic acid product is excellent, while the formation of difficultly separable by-products is kept at a minimum. Furthermore, it may be observed that the process of my invention involving concurrent dehydrogenation and polymerization of the toluic acid is a single stage reaction utilizing as starting materials relatively inexpensive compounds. In the prior art it is observed, in comparison, that several steps were necessary in practically every process of preparing the stilbene dicarboxylic acid. These steps involved the formation of intermediate products which in turn tended to complicate the process.

The stilbene dicarboxylic acids prepared by the process of my invention have many possible uses. For example, the ester derivatives may be suitable as plasticizers for different resinous plastics. Since stilbene dicarboxylic acid is capable of fluorescence typical of stilbene structures, its derivatives may be suitable for the preparation of fluorescent dyes. Many other uses known in the art for dibasic aromatic acids may be supplied with stilbene dicarboxylic acids derived by the process of my invention.

The novel tetra (carbon phenyl) thiophenes of my invention possess the combined chemical characteristics of thiophenes and polycarboxylic acids. Such compounds are capable of a great number of applications in industry, such as mineral oil additives, intermediates for mineral oil additives, intermediates in the manufacture of alkyd resins, etc. Their production by the new and improved process of my invention renders them sufficiently available to provide many additional commercial applications.

In view of the foregoing illustrations and specific embodiments of preferred process conditions for my invention, various modifications utilizing the principles of my invention will be apparent to one skilled in the art. My invention contemplates all such variations and modifications as come within the scope of the appended claims.

I claim:

1. A process which comprises dehydrogenating and concurrently polymerizing methyl benzoic acids at the methyl radical by heating said methyl benzoic acids to an elevated temperature in the presence of sulfur for a period of time to complete the reaction as indicated by $H_2S$ no longer being evolved.

2. A process of preparing stilbene dicarboxylic acids from methyl benzoic acids which comprises dehydrogenating and concurrently dimerizing methyl benzoic acids at the methyl radical by heating said methyl benzoic acids to an elevated temperature in the presence of sulfur for a period of time sufficient to complete the reaction as indicated by $H_2S$ no longer being evolved and separating the stilbene dicarboxylic acid products from the reaction mixture.

3. A process of preparing tetra (carboxy phenyl) thiophenes from methyl benzoic acids which comprises dehydrogenating and concurrently polymerizing methyl benzoic acids at the methyl radical by heating said methyl benzoic acids to an elevated temperature in the presence of sulfur for a period of time sufficient to complete the reaction as indicated by $H_2S$ no longer being evolved, removing the stilbene dicarboxylic acid products formed and separating the tetra (carboxy phenyl) thiophenes from the residue.

4. A process of preparing stilbene dicarboxylic acids which comprises the steps of heating methyl benzoic acids to a temperature of from about 450° F. to about 550° F. with from about 5 to about 50 mol per cent of sulfur for a period of from about 30 minutes to about 12 hours.

5. A process of preparing stilbene dicarboxylic acids from methyl benzoic acids which comprises dehydrogenating and concurrently dimerizing methyl benzoic acids at the methyl radical by heating said methyl benzoic acids with about 5 to 50 mol per cent of sulfur at a temperature of from about 450° F. to about 550° F. for a period of time sufficient to complete the reaction, as indicated by $H_2S$ no longer being evolved, and separating the stilbene dicarboxylic acid product from the reaction mixture.

6. A process of preparing stilbene dicarboxylic acids from methyl benzoic acids which comprises dehydrogenating and concurrently dimerizing methyl benzoic acids at the methyl radical by heating said methyl benzoic acids with about 5 mol per cent sulfur at a temperature of about 500° F. for a period of from about 3 to about 6 hours, and separating the stilbene dicarboxylic acid products from the reaction mixture.

7. A process according to claim 2, in which the methyl benzoic acids are present in the form of a mixture of their isomers.

8. A process according to claim 3, in which the methyl benzoic acids are present in the form of a mixture of their isomers.

9. A process according to claim 2, in which the methyl benzoic acids are present in the form of an isomeric mixture of toluic acids consisting of about 50 per cent meta-toluic acids and 50 per cent para-toluic acids.

10. A process according to claim 2, in which the methyl benzoic acids are substantially para-toluic acids.

11. A process according to claim 3, in which the methyl benzoic acids are substantially para-toluic acid.

12. A process according to claim 2, in which the sulfur is added in stepwise small increments, thereby maintaining a low concentration of sulfur in the reaction mixture.

13. Tetra (carboxy phenyl) thiophene.

14. Tetra (para-carboxy phenyl) thiophene.

WILLIAM G. TOLAND, Jr.

REFERENCES CITED

The following references are of record in the file of this patent:

Baumann, Chemische Berichte, 28, pp. 890–895 (1895).

Aronstein, Traveaux-Chemiques des Pays-Bas, 21, pp. 448–459 (1902).